United States Patent [19]

Schlüter

[11] 4,226,543

[45] Oct. 7, 1980

[54] MIXING HEAD, ESPECIALLY FOR REACTIVE COMPONENTS SUCH AS THOSE IN THERMOSETTING SYNTHETIC RESINS

[75] Inventor: Klaus Schlüter, Munich, Fed. Rep. of Germany

[73] Assignee: Krauss-Maffei AG, Münich, Fed. Rep. of Germany

[21] Appl. No.: 28,825

[22] Filed: Apr. 10, 1979

[30] Foreign Application Priority Data

Apr. 13, 1978 [DE] Fed. Rep. of Germany ....... 2815944

[51] Int. Cl.³ .......................... B01F 15/02; B01J 19/02
[52] U.S. Cl. ................................ 366/159; 137/625.48;
252/359 E; 261/DIG. 26; 366/479; 422/133;
422/224; 422/135; 422/242
[58] Field of Search ............... 422/133, 224, 242, 135;
366/159, 179; 252/359 E; 261/DIG. 26;
137/625.4, 625.48; 251/172

[56] References Cited

U.S. PATENT DOCUMENTS

| | | | |
|---|---|---|---|
| 3,347,260 | 10/1967 | Lewis, Sr. et al. | 137/625.48 X |
| 3,385,113 | 5/1968 | Harris | 137/625.48 |
| 3,799,199 | 5/1974 | Rumpff | 366/336 |
| 4,053,283 | 10/1977 | Scheider | 366/179 X |
| 4,126,399 | 11/1978 | Schneider et al. | 366/159 |

FOREIGN PATENT DOCUMENTS

| | | |
|---|---|---|
| 1814838 | 5/1959 | Fed. Rep. of Germany . |
| 1225374 | 9/1966 | Fed. Rep. of Germany . |
| 1255297 | 11/1967 | Fed. Rep. of Germany . |
| 1376485 | 9/1964 | France . |
| 863843 | 3/1961 | United Kingdom . |

Primary Examiner—Michael S. Marcus
Attorney, Agent, or Firm—Karl F. Ross

[57] ABSTRACT

A mixing head, specially for chemically reactive fluid components, such as two reactive liquids adapted to form a synthetic resin, has a central body which is provided with passages enabling recirculation of the individual components in one position of the mixing head and discharge of the mixture in another position. The wall of the housing in which the central body is movable is elastically deformable to effect sealing.

5 Claims, 4 Drawing Figures

MIXING HEAD, ESPECIALLY FOR REACTIVE COMPONENTS SUCH AS THOSE IN THERMOSETTING SYNTHETIC RESINS

FIELD OF THE INVENTION

The present invention relates to a mixing head or valve system, especially for two flowable reactive components, and, more particularly, to a mixing device for synthetic-resin components which react and tend to harden or gel a short time after such reaction.

BACKGROUND OF THE INVENTION

Various chemically reactive components, such as the components of two-part synthetic-resin systems (e.g. epoxy and urethane systems) must be combined before the reaction mixture is introduced into a mold or other shaping cavity in an intimate and uniform manner.

To this end, it has been proposed to provide mixing heads which form chambers into which the respective streams of the reactive components (resin and curing agent in the case of epoxies and polyol and diisocyanate in the case of urethane) open so as to permit mixing of the two components before or as the mixture is discharged axially from the mixing chamber into the cavity.

Such systems eliminate the need for agitators, stirrers and like movable mixing elements which are conventionally used in a mixing chamber to bring about an intimate combination of the two components.

In this connection, mention can be made of the following publications which deal with mixing heads of the type with which the present invention is concerned.

German Pat. No. 2,007,935 which corresponds to U.S. Pat. No. 3,706,515;
German utility model (Gebrauchsmuster) No. 7,310,963;
German Pat. No. 2,117,533 (which corresponds to U.S. Pat. No. 3,799,199); and
German Pat. No. 1,282,522 (which corresponds to U.S. Pat. No. 3,263,928).

Reference may also be had to German Pat. No. 1,225,374, to German published application (Auslegeschrift) No. 1,255,297, German utility model (Gebrauchsmuster) No. 1,814,838, French Pat. No. 1,376,485, British Pat. No. 863,843, U.S. Pat. No. 3,385,671, and U.S. Pat. No. 2,868,518 which were cited during the examination of German Pat. No. 2,007,935 mentioned above.

In German Pat. No. 2,007,935 and U.S. Pat. No. 3,706,515, a mixing head of the aforedescribed type is provided for synthetic-resin components which has a mixing chamber with lateral inlet ports for these components and an axial discharge opening.

A control plunger or piston is shiftable in this mixing chamber and is formed with recycling passages which, in one position of the plunger, connect each inlet port of a respective component to a return passage for this component and to a discharge port whereby the components circulate through the mixing head without contacting each other. In the open position of the plunger, the inlet ports communicate with the chamber so that the streams of the two components can mix and discharge through the axial outlet. In these systems, moreover, the plunger, in being displaced between the mixing position and the recycling position can discharge the residues of the mixed product from the chamber.

The recirculating or nonmixing phase assures continuous movement of components which might otherwise tend to congeal or gel.

When such mixing heads are operated at high pressure, it is of concern that in the nonmixing phase, i.e. when the synthetic-resin components supplied to the mixing head are recycled to the reservoir, the return should involve absolutely no mixing of the two components with one another. Obviously should mixing occur, hardening, congealing or gelling of the resulting mixture will also occur to block the mixing head or render it inoperative at least until it is cleared. The resulting synthetic-resin product also constitutes an impurity in the mixture itself when mixing is to resume and the mixture is to be discharged into the mold.

At high pressures, even with utmost care in the machining of the earlier mixing heads, it has been found that some seepage has occurred between the two components so that an undesired mixture is formed in the nonmixing or recirculating phase.

Problems are also encountered when one or both of the components contains a filler, which may be present in significant proportion to conserve the relatively expensive synthetic-resin components themselves. Typical fillers are glass fibers, limestone, and the like. In such cases, it is found to be advantageous to introduce the filled component into the mixing chamber through a plurality of inlet ports (e.g. three) as described for example in German utility model No. 73 10 963. Here again, a sealing problem arises because the mixing chamber, whose diameter is usually only about 10 mm, cannot accommodate more than two inlet ports at the same level or in the same plane without permitting some leakage around the axially movable control body and between the two liquids. Again, in these situations, the two components mix where they meet each other to form the synthetic-resin material in a detrimental manner.

Attempts have been made to solve the problem by forming the control piston or plunger with sealing grooves between the bypass or return flow passages (see German Pat. No. 2,117,533 and U.S. Pat. No. 3,799,199); the leaking synthetic-resin components, entering these grooves, mix together and form in situ a sealing mass or strand which blocks further interaction between the two components in the nonmixing phase.

While this latter technique has worked out well in practice, in recent years greater demands have been placed upon such mixing heads which must handle increasingly greater flow rates and pressures, to the point where earlier sealing systems have not been found to be wholly satisfactory.

OBJECTS OF THE INVENTION

It is the principal object of the present invention to provide a mixing head for the purposes described which avoids the disadvantages of the earlier systems and provides greater assurance against interaction of the two components in the nonmixing or recirculating phase of the operation of the mixing head.

Another object of this invention is to provide an improved mixing device for the purposes described which will afford a more effective seal between the two components to be mixed, even when the latter are delivered at very high pressures and at high rates and when a plurality of inlet ports may be required at any level of the mixing heads.

SUMMARY OF THE INVENTION

These objects and others which will become apparent hereinafter are attained in accordance with the present invention with a mixing head for the purposes described. i.e. for enabling the mixing of two chemically reactive components, especially components of a hardenable synthetic resin in one position of a plunger or control piston within a mixing chamber from which the mixture can be discharged axially, and causing the recycling or bypassing of the components through passages in the plunger or piston in the nonmixing position thereof, wherein the wall of the housing bore receiving the plunger and defining the mixing chamber is formed from an elastic material and hence is elastically deformable so that the plunger is received within an elastically deformable bore or body providing an effective seal between the housing and piston or plunger.

In the system of the present invention, therefore, sealing no longer requires the entrapment of a mass of the hardenable material in any groove of the plunger or piston, nor does it require machining to especially close tolerances.

Since the bore in which a control piston or plunger is received can vary (i.e. is elastically deformable) in diameter, an effective seal or enclosure is provided for the control plunger.

Another advantage of the system of the present invention, especially where the elastic material of the bore lining is wear-resistant, is that the expensive close-tolerance machining originally required for a mixing head in which rigid walls slidably engage one another can be avoided and in addition there is no danger that wear will increase the play and reduce the effectiveness of the seal.

The system of the present invention is thus particularly effective when abrasive fillers are carried by one or both of the liquid components.

According to another feature of the invention, the elastic material is introduced into the mixing-head housing in the form of a highly elastic sleeve which forms a guide sleeve or bushing for the piston or plunger and is composed of a wear-resistant material. The sleeve has an internal diameter which can be slightly less than the external diameter of the cylindrical piston or plunger.

According to another feature of the invention the elastic guide sleeve or bushing subdivides the interior of the housing into a plurality of pressure chambers communicating with at least one of the flow passages for at least one of the components or a source of fluid pressure so that the inward pressure upon the sleeve can be in part produced by fluid pressure to augment the elastic force with which the inner surface of the sleeve engages the piston or plunger. Advantageously, the pressure compartments or chambers are provided only in the region between bypass passages.

The elastic sleeve can be formed from an intrinsically elastic material such as an elastomer, or from a less soft material such as a metal, e.g. in the form of a thin-wall elastic sleeve.

According to another feature of the invention, the pressure in the compartments is controlled with respect to magnitude and/or time, e.g. via a valve, so that the pressure is only applied in the position of the piston or plunger in which the inlet openings or orifices are closed off from the mixing chamber.

In the best-mode embodiment of the present invention, the sleeve is a highly elastic sleeve which has an internal diameter less than the external diameter of the plunger to provide an especially firm seal.

Mention should be made of the fact that German Pat. No. 1,282,522 describes a mixing head in which the piston or plunger is only intended to couple the piston more closely to the housing wall to increase the cleaning effectiveness by driving residues of the mixture from the mixing chamber. This device does not solve the problems discussed above because it does not permit recirculation of the liquid components in a nonmixing phase nor does it deal with the system in which the bypass passages are formed on the external periphery of the plunger or piston.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
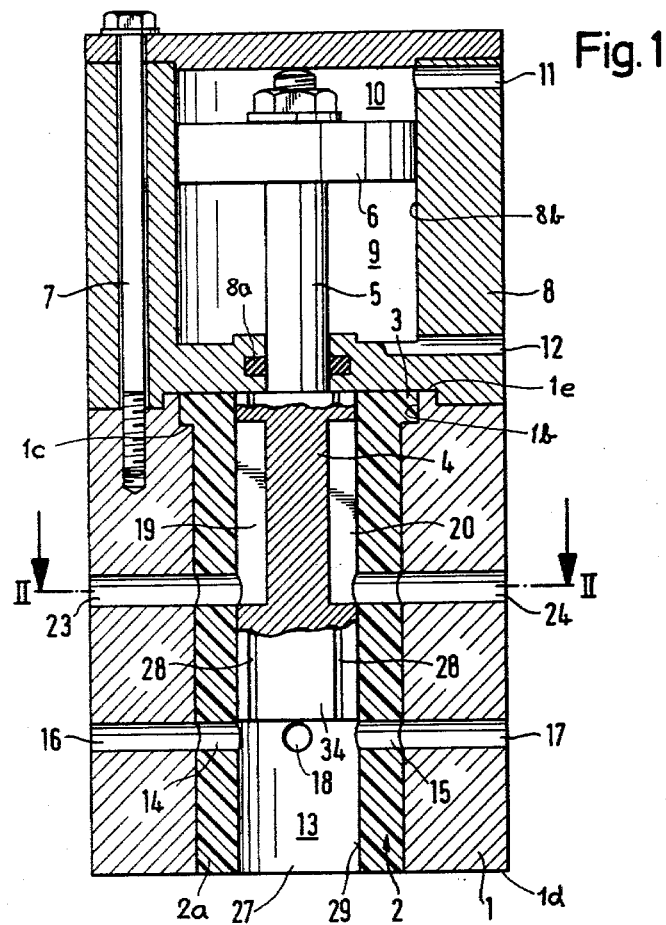
FIG. 1 is an axial cross-sectional view through a mixing head according to the present invention.

In FIG. 1 of the drawing, there is shown a mixing head which comprises a square-cross-section housing 1 formed with a cylindrical bore 1a in which a sleeve or bushing 2 of highly elastic synthetic-resin material, e.g. an elastomer, or a low-friction wear-resistant material such as polytetrafluoroethylene is snugly received. The sleeve 2 has a cylindrical portion 2a and a transverse flange 3 at its upper end, this flange resting in a recess 1b against a shoulder 1c on the housing 1 and terminating flush with the end face 1d at the discharge end of the mixing head and with the end face 1e at the opposite extremity thereof.

The original outer diameter of the cylindrical portion 2a may be slightly greater than the inner diameter of the bore 1a to ensure a sealing engagement of the sleeve in this bore and hence a press fit.

The sleeve 2 constitutes a liner which is provided with a cylindrical bore 29 whose internal diameter is slightly less than the external diameter of a plunger or piston 4 which is guided therein.

The bore 29, in an upper position of the plunger 4, defines a mixing chamber beneath the lower end face of this plunger. The plunger 4 is axially shiftable on a stem 5 which is engaged by a seal 8a recessed in a cylindrical housing 8 connected with the housing 1 by bolts, one of which has been shown at 7, which are angularly equispaced about the axis of the device.

The housing 8 forms a cylinder 8b for an operating fluid which acts upon a piston 6 connected to the plunger stem 5 and is subdividing the interior of the cylinder into pressurizable compartments 9 and 10 respectively connected by bores 12 and 11 with a control pressure source.

The control pressure source can pressurize compartment 10 to drive the plunger 4 downwardly while compartment 9 is drained, thereby driving mixture residues out of the mixing chamber 13. When the chamber 9 is pressurized and chamber 10 is vented or drained, the plunger 4 is shifted into the position shown in FIG. 1 to define the mixing chamber 13.

In its upper limiting position shown in FIG. 1, wherein the plunger 4 clears the mixing chamber 13, inlet ports 16 through 18 for the plurality of components, as described in U.S. Pat. Nos. 3,706,505 and 3,799,199, train jets of the components upon one another to intimately mix within the chamber 13. Four such inlet ports may be provided in diametrically opposite pairs in a common horizontal plane perpendicular to the axis of the head.

The pump means, reservoirs and ducts for supplying and carrying away the liquid components have not been illustrated in the drawing since they are amply described in the U.S. patents mentioned immediately above.

In alignment with the passages 16, 17 and 18, the elastic liner 2 is provided with ports, e.g. at 14 and 15, to admit the synthetic-resin components while the lower end of the liner is open at 27 to provide an outlet for the mixture.

The plunger 4 is formed with four angularly equispaced axially extending outwardly open bypass passages 19, 20, 21 and 22, e.g. in the form of grooves over part of the length of the plunger, which register with the ports 14, 15 etc., of the inlet passages and with outlet ports in the liner communicating with outlet passages 23, 24, 25 and 26 returning the bypassed liquid components to respective reservoirs.

In the upper portion of the plunger 4, the synthetic-resin components, which are delivered under high pressure by four pipes connected to the passages 16, 17, 18 etc., are admitted to the chamber 13 and thoroughly mixed therein, the mixture being driven into the mold as described in the aforementioned U.S. patents by the descent of the plunger 4. Simultaneously with expunging all of the mixture from the chamber 13, the plunger establishes communication between the passages 16 and 23, 17 and 24 etc., with the bypassed components being returned via respective pipes to the respective reservoirs so that the components are in a continuous state of movement.

Generally speaking, four different liquid synthetic-resin components are not used, in spite of the provision of four inlet ports in diametrically opposite pairs. Customarily, only two synthetic-resin components are used, one of which can contain the filler. In this case, one of the inlet ports may be supplied with the component which is not charged with the filler, e.g. a polyol, while the other three inlet ports are connected to a common source of the other filler-charged component, e.g. an isocyanate.

The two components mix in the chamber 13 at high pressure at three entrance velocities and by impact of the diametrically opposed jets or streams against one another, the intimate mixture being displaced from the chamber by the flow velocity and, at the end of the injection by the descent of the plunger as described. In the mold the mixture can harden in the usual manner.

It is vital, as has been described, to prevent contact of the two liquid components with one another in the closed position of the mixing head, i.e. when the plunger has its end flush with the end 1d of the housing and such contact is prevented by the snug fit of the plunger 4 in the elastic sleeve 2. Additional security against detrimental mixing of the two components can be obtained by forming the plunger 4 with longitudinally extending grooves 28 which form sealing grooves in the sense already described between the bypass passages 19 through 22. Any portions of the components which may manage to leak into these grooves react and form in situ a sealing mass which conforms to the surface of alignment and acts as a further barrier to intermingling of the two components.

Since the sleeve 2 is constituted of flexible synthetic resin and the bore 29 is underdimensioned with respect to the outer diameter of the plunger 4, e.g. by about 0.2 mm, the intrinsic inward pressure upon compression of the liner 2 maintains an especially effective seal. In other words, as the plunger 4 is moved along the sleeve, the sleeve is compressed by the plunger against the inner wall of the bore 1a to reinforce the sealing action.

Figure 2:
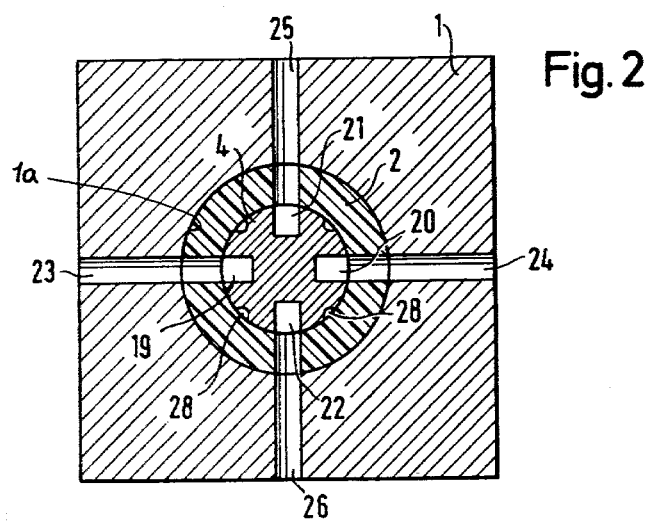
FIG. 2 is a cross-sectional view taken along the line II—II of FIG. 1.
Figure 3:
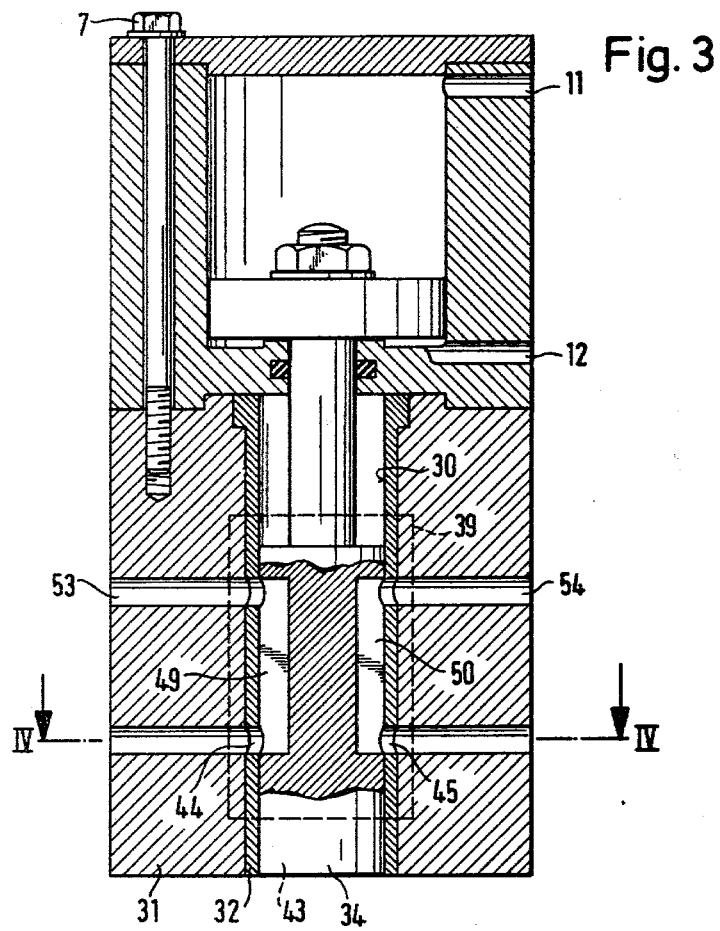
FIG. 3 is a longitudinal cross-sectional view of a mixing head in accordance with another embodiment of the invention.
Figure 4:
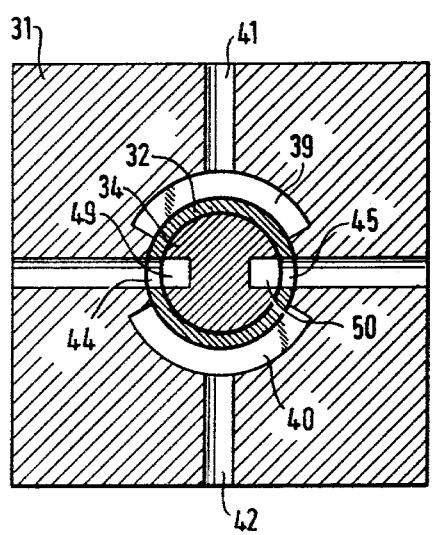
FIG. 4 is a cross-sectional view taken along the line IV—IV of FIG. 3.

FIGS. 3 and 4 show a similarly operating mixing head which differs from that of FIGS. 1 and 2 in that only two inlet passages 44 and 45 communicate with the mixing chamber 43 while the plunger 34 is provided with only two bypass passages 49 and 50 which can also communicate with the return passages 53, 54.

In place of the sleeve 2 of flexible synthetic resin in FIGS. 1 and 2, a liner 32 which of thin-wall and comparatively yieldable construction, is fitted into the housing 31 so that its bore 30 receives the piston 34 with normal metal-to-metal tolerances.

As will be apparent especially from FIG. 4, radially outwardly ouf the sleeve or liner 32, in the region of the bypass passages 49 and 59 (when the latter are effective to recirculate the components), two substantially semi-cylindrical sectoral-shaped chambers 39 and 40 are provided in the housing 31 and are connected by passages 41 and 42 with a pressure source. The fluid pressure generated within the chambers 39 and 40 thus presses the liner 32 radially inwardly against the plunger 34 to seal the latter between the bypass passages 49 and 50.

It is desirable, in this construction, to apply the pressure to the chambers 39 and 40 only when the plunger is in its recirculating position (nonmixing phase, e.g. via a valve 60) with the pressure being relieved to enable the plunger to be displaced into its other extreme position for mixing without having to encounter the increased frictional force which would result if the pressure was maintained during this movement. Naturally the decreased frictional force reduces the energy which may be required to displace the plunger and prevents wear of the plunger.

The sleeve of elastomeric material of FIGS. 1 and 2 can also be used in the systems of FIGS. 3 and 4 merely by substitution for the deformable metal sleeve of these Figures.

I claim:

1. A mixing head for at least two flowable components, comprising:

housing means including means defining an internally located axially extending bore, means defining at least one pair of inlet ports opening into said bore transversely and connected to respective sources of said components, means defining at least one pair of return ports opening into said bore at a location axially spaced from said inlet port means, said return ports being connectible to respective reservoirs of said components and means defining an axial outlet located at the downstream end of said bore means for discharge of a mixture of said components delivered by said inlet ports;

means forming an elastic wall along said bore and having a variable inner diameter;

a control plunger axially shiftable in contact with said wall between a first position wherein said mixture is expressed through said outlet and a second position wherein said plunger is retracted from said outlet and said inlet ports open into a mixing chamber formed within said wall between said plunger and said outlet, said plunger being formed with a pair of bypass passages angularly spaced apart around said plunger and axially extending to connect each inlet port with a respective return port in said first position of said plunger, the elastic wall bearing upon said plunger between said passages for sealing said components against mixture between said plunger and the wall, said means forming said wall including a thin-walled elastic sleeve received in said bore, said housing means being formed between said passages with at least one pressurizable compartment closed by said sleeve, and means for pressurizing said compartment to deform said sleeve against said plunger at least between said return ports.

2. The mixing head defined in claim 1 wherein said sleeve is composed of a synthetic resin.

3. The mixing head defined in claim 1 wherein a plurality of said compartments are provided exclusively in regions between said passages.

4. The mixing head defined in claim 1 or claim 3 wherein said sleeve is composed of metal.

5. The mixing head defined in claim 4, further comprising means for controlling the pressurization of said compartments to increase the pressure when said plunger is in said first position and to decrease said pressure when said plunger is displaced to and from said first position.

* * * * *